US005723568A

United States Patent [19]
Shimada et al.

[11] Patent Number: 5,723,568
[45] Date of Patent: Mar. 3, 1998

[54] POLYAMIDE SOLUTION COMPOSITION AND METHODS FOR PRODUCING FIBRIDS AND PAPER-LIKE SHEETS USING THE SAME

[75] Inventors: Keizo Shimada; Jiro Sadanobu, both of Iwakuni; Tsugusi Yosida, Iwakun; Yuzo Aito, Iwakuni, all of Japan

[73] Assignee: Teijin Limited, Osaka, Japan

[21] Appl. No.: 580,649

[22] Filed: Dec. 29, 1995

[30] Foreign Application Priority Data

Jan. 17, 1995 [JP] Japan ............................. 7-004994
Feb. 20, 1995 [JP] Japan ............................. 7-022882
Mar. 3, 1995 [JP] Japan ............................. 7-044249
Mar. 3, 1995 [JP] Japan ............................. 7-044250

[51] Int. Cl.$^6$ .................. C08G 73/10; C08L 77/06; C08L 79/00
[52] U.S. Cl. .................. 528/310; 528/312; 528/322; 528/335; 528/336; 524/600; 524/606; 47/58
[58] Field of Search .................. 524/600, 606; 528/310, 312, 322, 335, 336; 47/58

[56] References Cited

U.S. PATENT DOCUMENTS 3,831,317  8/1974  Porte ............................. 47/58

FOREIGN PATENT DOCUMENTS 868651  5/1961  United Kingdom.

OTHER PUBLICATIONS

Database WPI, Section Ch, Week 9006, Derwent Publications Ltd., London, GB; Class A 23, AN 90-039864SPO02992580 & JP-A-01 315 464 (Asahi Chemical Ind. KK), 20 Dec. 1989 (abstract).
Database WPI, Section ch, Week 9109, Derwent Publications Ltd., London, GB; Class A32, AN 91-061426XPO02002581 & JP-A-03 009 931 (Asahi Chemical Ind. KK), 17 Jan. 1991 (abstract).
Database WPI, Section Ch, Week 7746, Derwent Publications Ltd., London GB; Class A97, AN 77-81863YXPO02002582 & JP-A-52 118 006 (Teijin KK), 4 Oct. 1977 (abstract).
Database WPI, Section Ch, Week 9023, Derwent Publications Ltd., London, GB; Class A23, AN 90-175300XPO02002583 & JP-A-02 115 228 (Teijin KK), 27 Apr. 1990 (abstract).

*Primary Examiner*—P. Hampton-Hightower
*Attorney, Agent, or Firm*—Sughrue, Mion, Zinn, Macpeak & Seas, PLLC

[57] ABSTRACT

A polyamide comprising a solution of (i) an aliphatic polyamide and/or an aliphatic aromatic poly amide dissolved in (ii) N-methyl-2-pyrrolidone and containing (iii) calcium chloride, the ratio between the polyamide (i) and the N-methyl-2-pyrrolidone (ii) in the solution composition being 3 to 25% by weight of the polyamide (i)to 97 to 75% by weight of the N-methyl-2-pyrrolidone, (ii) with the solution also containing calcium chloride (iii) in an amount of 5 to 60 parts by weight based on 100 parts by weight of the polyamide (i) which can be precipitated in a precipitant consisting essentially of water while stirring the precipitant to provide fibrids, which then can be mixed with fibers or natural pulp and formed into synthetic paper.

13 Claims, No Drawings

1

POLYAMIDE SOLUTION COMPOSITION AND METHODS FOR PRODUCING FIBRIDS AND PAPER-LIKE SHEETS USING THE SAME

FIELD OF THE INVENTION

This invention relates to a composition comprising a solution of an aliphatic polyamide and/or an aliphatic aromatic polyamide, methods for producing fibrids Using the same and paper-like sheets using the fibrids. More particularly, it relates to composition comprising a solution of an aliphatic polyamide and/or an aliphatic aromatic polyamide, N-methyl-2-pyrrolidone and calcium chloride which is suitable for shaping films, fibers and fibrids and methods for producing the fibrids good in papermaking properties using the solution composition and producing paper-like sheets, so-called "synthetic paper", using the resulting polyamide fibrids.

BACKGROUND OF THE INVENTION

It is well-known that aliphatic polyamides such as polycaprolactam (nylon 6) or polyhexamethylene adipamide (nylon 6 6) have a melting point of 210° to 280° C. and fibers, films and the like can be produced from them by melt shaping. Furthermore, there are well known methods for dissolving the polymers in concentrated sulfuric acid, formic acid or the like and producing synthetic pulps called "fibrids" from the resulting solutions thereof.

For example, German Patent No: 2056010 (and the corresponding U.S. Pat. No. 3,831,817) discloses a method for dissolving polycaprolactam (nylon 6) or polyhexamethylene adipamide (nylon 6 6) in concentrated sulfuric acid, pouring the resulting solution into a 1N aqueous solution of NaOH and producing the fibrids.

As mentioned above, aliphatic polyamides are soluble in concentrated sulfuric acid; however, production of a shaping from the concentrated sulfuric acid solution requires a large amount of sulfuric acid and an alkali hydroxide for neutralizing the sulfuric acid. Not only must a large quantity of water be used in washing when the washing is only with water without using a neutralizing agent to remove the sulfuric acid but also problems in corrosion of the apparatus are unavoidable. As a result, a solution prepared by dissolving the aliphatic polyamide in concentrated sulfuric acid is hardly regarded as a practically favorable polyamide solution composition.

In addition, Japanese Patent Publication (Kokoku) No. 35-11851/1960 (and the corresponding UK Patent No.868, 651) discloses that fibrids obtained from a polyhexamethylene adipamide-polycaproamide copolymer which is an aliphatic polyamide have excellent characteristics. The copolymer is soluble in concentrated sulfuric acid, formic acid, ethylene glycol, N,N-dimethylformamide, N,N-dimethylacetamide, N-methyl-2-pyrrolidone and m-cresol.

However, homopolyamides such as polycaprolactam (nylon 6) and polyhexamethylene adipamide (nylon 6 6) are soluble only in concentrated sulfuric acid, formic acid and m-cresol and sparingly soluble in N,N-dimethylformamide, N,N-dimethylacetamide, N-methyl-2-pyrrolidone and ethylene glycol. Therefore, it is difficult to prepare good aliphatic polyamide solutions by using these polar solvents.

As described above, phenolic solvents such as phenol or cresol are known as a solvent for aliphatic polyamides. Since phenolic solvents are slightly soluble in water, polyamide solution compositions prepared by using the phenolic solvents require specific organic solvents as a precipitant (coagulating liquid) in order to provide shaped products such as fibers, films or fibrids from the solution compositions by a wet-process, and not only the cost is increased but also there are problems even in aspects of environmental hygiene and safety from fire.

On the other hand, although aliphatic aromatic polyamides represented by polyhexamethylene terephthalamide (nylon 6 T), polyhexamethylene isophthalamide (nylon 6 I), polyhexamethylene terephthalisophthalamide (nylon 6 TI) and the like are soluble in concentrated sulfuric acid, the production of a shaping from solutions thereof in concentrated sulfuric acid requires a large amount of the concentrated sulfuric acid and further an alkali hydroxide for neutralizing the concentrated sulfuric acid. Furthermore, problems arise because a large quantity of water must be used in the case of washing thereof only with water and removing the residual sulfuric acid without using a neutralizing agent but also problems in corrosion of apparatuses are unavoidable.

Phenolic solvents such as phenol or cresol are also known as the solvent for the aliphatic aromatic polyamides; however, these phenolic solvents are sparingly soluble in water. Therefore, aliphatic aromatic polyamide solution compositions prepared by using the phenolic solvents require specific organic solvents such as alcohols or ketones as a precipitant (coagulation liquid) in order to obtain shaped products such as fibers, films or fibrids from the solution compositions by a wet-shaping process. Not only is the cost increased but also there are problems even in aspects of environmental hygiene and safety from fire.

SUMMARY OF THE INVENTION

A first object of this invention is to solve various problems found in the conventional aliphatic polyamide solution compositions and aliphatic aromatic polyamide solution compositions and to provide a novel polyamide solution composition well shapable (or moldable) by using an aqueous coagulation liquid having high safety.

A second object of this invention is to provide a method for industrially and advantageously producing, fibrids which have excellent papermaking properties by using the polyamide solution composition.

A third object of this invention is to provide a method for producing paper-like sheets which have good mechanical characteristics by using the fibrids.

These and other objects of this invention will become more apparent from the following description.

It has been newly found that a specific solvent system comprising N-methyl-2-pyrrolidone and calcium chloride is capable of specifically dissolving aliphatic polyamides, aliphatic aromatic polyamides or mixtures thereof quite well and further is highly miscible with water and a solution composition prepared by dissolving the polyamide in the solvent system, therefore, can be wet-shaped by using an aqueous coagulation liquid to provide good fibrids by wet-shaping.

Thus, this invention provides a polyamide composition comprising a solution of:

(i) an aliphatic polyamide, an aliphatic aromatic polyamide or a mixture thereof;

(ii) N-methyl-2-pyrrolidone; and (iii) calcium chloride;

with the solution composition specifically containing 3 to 25% by weight of the aliphatic polyamide and/or aliphatic aromatic polyamide (i) and 97 to 75% by weight of N-methyl-2-pyrrolidone (ii) and further containing calcium chloride (iii) in an amount of 5 to 60 parts by weight based on 100 parts by weight of the polyamide.

Furthermore, this invention provides a method for producing fibrids of an aliphatic polyamide and/or aliphatic aromatic polyamide, which comprises introducing a solution of the polyamide into a precipitant (coagulation liquid) consisting essentially of water while stirring the precipitant and precipitating the polyamide into pulp-like particles, i.e., fibrids.

In addition, this invention provides a method for producing paper-like sheets, which comprises preparing a paper-like sheet from fibrids of the aliphatic polyamide and/or aliphatic aromatic polyamide produced according to the method.

DETAILED DESCRIPTION OF THE INVENTION

A detailed explanation is given below of the aliphatic polyamide solution composition, the method for preparing the same, the aliphatic aromatic polyamide solution composition, the method for preparing the same and the methods for producing the fibrids and further the paper-like sheets using the fibrids of this invention in the order mentioned.

(a) Aliphatic Polyamide Solution Composition and Preparation Thereof

The polymer used in the aliphatic polyamide solution composition of this invention is an aliphatic polyamide. For example, aliphatic polyamides having a polymer recurring unit represented by the following general formula [1] or [2] are cited as the aliphatic polyamide:

$$(-OC-R^1-CO-NH-R^2-NH-) \quad [1]$$

[wherein $R^1$ denotes an alkylene group of 2 to 12 (preferably 4) carbon atoms; $R^2$ denotes a chain or cyclic alkylene group or aralkylene group of 4 to 10 (preferably 6) carbon atoms.]

$$(-NH-R^3-CO-) \quad [2]$$

[wherein $R^3$ denotes an alkylene group of 5 carbon atoms.]

Specific examples of aliphatic polyamides include polycaprolactam (nylon 6), polyhexamethylene adipamide (nylon 6 6), polytetramethylene adipamide (nylon 4 6), polyhexamethylene sebacamide (nylon 6 10) polyethylene sebacamide (nylon 2 10), copolymers thereof and further poly(methylenebi[p-cyclohexylene]adipamide) (PACM-6), poly(m-xylylene adipamide) and the like. In this invention, however, homopolymers which are not copolymers are preferred as the aliphatic polyamide so as not to lower the melting point of the polymer (to 180° C. or below).

Specific examples of preferred aliphatic polyamides include polycaprolactam (nylon 6), polyhexamethylene adipamide (nylon 6 6), polytetramethylene adipamide (nylon 4 6) and polyhexamethylene sebacamide (nylon 6 10); however, of these polyamides, polycaprolactam (nylon 6) and polyhexamethylene adipamide (nylon 6 6) are particularly preferred. These polyamides are usually used alone, but two or more polymers, if desired, may be blended.

N-methyl-2-pyrrolidone (hereinafter sometimes abbreviated to NMP) or a mixed solvent consisting essentially thereof is used as a solvent forming the aliphatic polyamide solution composition of this invention. In general, in addition to NMP, examples of amide-based solvents include N,N-dimethylacetamide (DMAC), N,N-dimethylformamide (DMF) and the like. Further, examples of urea-based solvents include tetramethylurea, N,N-dimethylethyleneurea and the like. However, all of these solvents other than NMP have poor solubility for the aliphatic polyamide, and a good solution cannot be prepared. It is possible to replace, however, a part of the NMP (for example, 20% by weight or less, preferably 10% by weight or less, thereof) with other amide-based solvents (for example, DMAC) miscible with the NMP as long as the solubility is not deteriorated.

On the other hand, calcium chloride which is the other component forming the aliphatic polyamide solution composition of this invention may be either unhydrated or hydrated calcium chloride. As the hydrated calcium chlorides having 1 to 3 molecules of water of crystallization, $CaCl_2.nH_2O$ (n is 1, 2 or 3), are preferably used. According to research, it has been found that the solubility is better in the presence of a small amount of water and $CaCl_2.H_2O$ is most preferable.

Thus, this invention provides a solution prepared by dissolving an aliphatic polyamide in a solvent system of $NMP/CaCl_2$ and is based on the finding that the particular solvent system specifically manifests good solubility of the aliphatic polyamide therein. This dissolving behavior could not be anticipated from the conventional knowledge at all.

The aliphatic polyamide solution composition of this invention is a stable and uniform solution composition comprising the aliphatic polyamide, NMP and $CaCl_2$ as mentioned above, and the concentrations of the aliphatic polyamide and NMP in the solution composition are 3 to 25% by weight, preferably 5 to 20% by weight, of the aliphatic polyamide and 97 to 75% by weight, preferably 95 to 80% by weight, of the NMP based on the total weight of the aliphatic polyamide and NMP. The concentration of the calcium chloride is 5 to 55 parts by weight, preferably 30 to 50 parts by weight, of the calcium chloride (expressed in a form not containing water of crystallization) based on 100 parts by weight of the aliphatic polyamide.

The concentration of the aliphatic polyamide in the aliphatic polyamide solution composition must be 3% by weight or above based on the total weight of the aliphatic polyamide and NMP. When the concentration is lower than that, disadvantages in recovering the solvent occur, and the stability, productivity and the like of the wet shaping are unfavorably deteriorated. On the other hand, when the concentration is too high, the dissolution of the polymer requires too much time and simultaneous heating. When a solution composition at a high concentration is cooled to ambient temperature, there is a tendency for the viscosity of the solution composition to suddenly increase and gel or solidify. Since this is disadvantageous in shaping processes, the concentration must be 25% by weight or below.

The concentration of the calcium chloride is selected depending to the amount of the aliphatic polyamide. If the weight of the calcium chloride (calculated as an unhydrated salt in the case where a hydrated salt is used) in the solution composition is less than 5 parts by weight based on 100 parts by weight of the aliphatic polyamide, the solubility of the polyamide is lowered. Since the effects are not increased even if the amount of calcium chloride is increased above 55 parts by weight, and use of an amount of calcium chloride larger than 55 parts by weight is economically unfavorable. Since the solubility may be deteriorated when a prescribed amount or more of water is present in the composition, the molar amount of water must be controlled to 5 times or below that of the calcium chloride even at the maximum.

The aliphatic polyamide solution composition of this invention can be prepared by placing a prescribed amount of pellets or pulverized fine powder of the aliphatic polyamide, together with a prescribed amount of NMP and a prescribed amount of calcium chloride, in a container, stirring the resulting mixture at a temperature of 30° C. or above to the boiling point or below, preferably at a temperature of about 40° to 200° C. for about 20 minutes to 2 hours and dissolving the polymer. When the polymer concentration in the prepared polymer solution composition is low, for example, about 5% by weight, a liquid state is maintained even in cooling the composition to 30° C. If the polymer concentration becomes about 15% by weight, the viscosity is slowly increased by cooling, depending on the kind of the aliphatic polyamide, thus gradually converting the composition into an emulsion, a jelly or a solid. Even in this case, the composition is redissolved by heating to, for example, about 50° C. to provide a low-viscosity liquid state.

The aliphatic polyamide solution composition thus obtained has a neutral pH (pH 6 to 8), and it is extremely advantageous in storage or transportation of the solution and the wet shaping or the like of fibrids without causing corrosion of the apparatus, containers and the like as recognized in a solution composition prepared by using concentrated sulfuric acid or formic acid.

(b) Aliphatic Aromatic Polyamide Solution Composition and Preparation Thereof

The polyamide forming the aliphatic aromatic polyamide solution composition is a polyamide, wherein 20 mole % or more, preferably 50 mol % or more, of either of an acid component or a diamine component forming the polyamide is an aromatic dicarboxylic acid or an aromatic diamine. Specifically, aliphatic aromatic polyamides having a polymer recurring unit represented by the following general formula [3] or [4] are cited as the aliphatic aromatic polyamide:

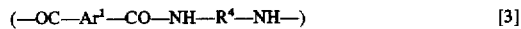

(—OC—Ar¹—CO—NH—R⁴—NH—)  [3]

[wherein $Ar^1$ is a p- or m-phenylene group; the benzene ring thereof may also be partially substituted by a methyl group or a halogen atom; $R^4$ is an alkylene group of 4 to 10 (preferably 6) carbon atoms.]

(—OC—R⁵—CO—NH—Ar²—NH—)  [4]

[wherein $Ar^2$ is a p- or m-phenylene group; the benzene ring thereof may be partially substituted by a methyl group or a halogen atom; $R^5$ is an alkylene group of 4 to 8 carbon atoms.]

Specific examples of such aliphatic aromatic polyamides include polyhexamethylene terephthalamide (nylon 6 T), polyhexamethylene isophthalamide (nylon 6 I), polyhexamethylene terephthalisophthalamide (nylon 6 TI), polyhexamethylene terephthaladipamide (nylon 6 T6), polyhexamethylene isophthaladipamide (nylon 6 I6), polyhexamethylene terephthalisophthaladipamide (nylon 6 TI6) and the like or poly-m-phenylene adipamide, polytolylene adipamide and the like. Among them, polyhexamethylene terephthalamide (nylon 6 T), polyhexamethylene isophthalamide (nylon 6 I), polyhexamethylene terephthalisophthalamide (nylon 6 TI) and, polyhexamethylene terephthalisophthaladipamide (nylon 6 TI6), wherein raw materials are readily available and the heat resistance of the polymer is good, are preferably used.

The solvent forming the aliphatic aromatic polyamide solution composition used in this invention is N-methyl-2-pyrrolidone (sometimes abbreviated to NMP) or a mixed solvent consisting essentially thereof and used as a solvent system containing calcium chloride mixed therein.

In general, in addition to the NMP, examples of the amide-based solvents include N,N-dimethylacetamide, N,N-dimethylformamide and the like. Furthermore, examples of urea-based Solvents include tetramethylurea, N,N-dimethylethyleneurea and the like. However, all of these solvents except NMP have poor solubility for the aliphatic aromatic polyamide, and a good solution of the polyamide cannot be prepared in the same manner with NMP. It is possible to replace, however, a part of the NMP (for example, less than 20% by weight of NMP, preferably less than 10% by weight of NMP) with other amide-based solvents miscible with the NMP as long as the solubility is not deteriorated.

On the other hand, calcium chloride which is one component forming the solution composition in this invention may be either unhydrated or hydrated calcium chloride. As the hydrated calcium chloride, $CaCl_2.nH_2O$ (n is 1, 2 or 3), having 1 to 3 molecules of water of crystallization is preferably used. The solubility is better in the presence of a small amount of water, and $CaCl_2.2H_2O$ containing 2 molecules of water of crystallization is most preferable.

Thus, this invention is most characterized by using a solution composition which is novel itself and which is prepared by dissolving the aliphatic aromatic polyamide in a solvent system of $NMP/CaCl_2$ and based on the finding that only the particular solvent system specifically manifests good solubility of the aliphatic aromatic polyamide therein. This dissolving behavior could not be anticipated from conventional knowledge in the art.

A method for placing a prescribed amount of pellets or pulverized fine powder of the aliphatic aromatic polyamide, a prescribed amount of NMP and a prescribed amount of calcium chloride in container, stirring the resulting mixture at a temperature of 30° C. or above to the boiling point or below, preferably at a temperature of about 50° to 200° C. for about 20 minutes to 2 hours and dissolving the polymer can be used as the method for preparing the aliphatic aromatic polyamide solution composition.

When the polymer concentration in the prepared polymer solution composition is low, for example, about 5% by weight, the liquid state is maintained even on cooling the composition to 30° C. When the polymer concentration attains about 15% by weight, the viscosity is slowly increased on cooling, depending on the kind of the aliphatic aromatic polyamide, thus gradually converting the composition into an emulsion, a jelly or a solid. Even in this case, the composition is redissolved by heating to, for example, about 50° C. to provide a low-viscosity liquid.

The aliphatic aromatic polyamide solution composition thus obtained is neutral pH (pH 6 to 8), and it is extremely advantageous in storage and transportation of the solution or the production of fibrids (i.e., pulp-like materials) using a wet process without any corrosion of containers or apparatus as occurs in a solution composition prepared by using concentrated sulfuric acid or formic acid.

Both (a) the aliphatic polyamide solution composition and (b) the aliphatic aromatic polyamide solution composition described above essentially comprise three components, i.e., (i) the polyamide, (ii) NMP and (iii) calcium chloride and, if desired, (iv) additives, for example, a stabilizer, a flame retardant, a mold release agent, a colorant, a delustering agent, an antistatic agent or a filler can be present.

In this invention, the aliphatic polyamide and the aliphatic aromatic polyamide can be used in combination and, for example, a blend of nylon 6 6 with nylon 6 TI6 may be employed as the polyamide. In this case, the total amount of both the polyamides may be within the blending range as described above in the solution composition.

(c) Production of Aliphatic Polyamide Fibrids

According to this invention, fibrids are produced using the aliphatic polyamide solution composition. A method for dropping (or pouring) the corresponding aliphatic polyamide solution composition into a coagulation bath comprising a precipitant consisting essentially of water while stirring the bath at a high speed is adopted as the method for producing the fibrids.

Water alone can be used as the precipitant or further mixed with other precipitants or a coagulation regulator for the precipitating. For example, an amide-based solvent can be used as the coagulation regulator. NMP can be used as a preferred example of the amide-based solvent. The amount of the mixed amide-based solvent is not especially limited. If the amount of the mixed amide-based solvent is too much, the produced pulp-like materials are mutually flocculated and fused with a disadvantageous deterioration of mechanical, electrical and thermal characteristics of sheet-like materials obtained by processing the fibrids and additional papermaking properties. Therefore, the amount of the mixed amide-based solvent is preferably controlled to 30% by weight or less in the coagulation bath.

The temperature of the solution composition is preferably 30° to 80° C. The coagulation bath temperature is also one of the important factors in obtaining fibrids which has good papermaking properties and shape, and a temperature of usually 5° to 70° C., preferably 10° to 50° C. is employed.

Operations are preferably performed so as to desolvate the solution composition introduced into a coagulation bath comprising the precipitant stirred at a high speed and simultaneously apply shearing or beating actions thereto. The precipitant is used in an amount based on the aliphatic polyamide solution composition at a weight ratio of preferably 5/1 to 200/1, more preferably 10/1 to 100/1.

Thus, aliphatic polyamide fibrids (pulp-like materials) with good papermaking properties are obtained.

A device comprising a stator combined with a rotor as described in Japanese Patent Publication (Kokai) No. 52-15621/1977 can be advantageously used as a precipitating device.

Since concentrated sulfuric acid, formic acid and the like are not present in the aliphatic polyamide fibrids thus produced at all, no problems due to corrosion of apparatus even in papermaking processes occur, and the aliphatic polyamide fibrids are preferred as an industrial papermaking raw material.

(d) Production of Aliphatic Aromatic Polyamide Fibrids

The solution composition used for producing the aliphatic aromatic polyamide fibrids in this invention is a uniform solution composition comprising the aliphatic aromatic polyamide, NMP and calcium chloride as described above, and the ratio between the aliphatic aromatic polyamide and the NMP must be 3 to 25% by weight (preferably 5 to 20% by weight) of the aliphatic aromatic polyamide to 97 to 75% by weight (preferably 95 to 80% by weight) of the NMP. The calcium chloride concentration must be 5 to 60 parts by weight, especially 20 to 55 parts by weight, based on 100 parts by weight of the aliphatic aromatic polyamide.

The concentration of the aliphatic aromatic polyamide in the solution composition must be 3% by weight or more based on the total weight of the aliphatic aromatic polyamide and NMP. If the concentration is too low, this is disadvantageous in the recovery of the solvent and stability, productivity and the like in producing the fibrids by the wet-shaping are deteriorated. Therefore, the concentration must be 3% by weight or more, preferably 5% by weight or more. On the other hand, if the concentration is too high, not only is a large amount of time required for the polymer to dissolve but also high-temperature heating must be used. When a solution composition at the high concentration is cooled to ambient temperature, there is a tendency for the viscosity of the solution composition to suddenly increase and the composition gels or solidifies. Since this is disadvantageous in shaping processes for the fibrids, the concentration is preferably 3% to 25% by weight, more preferably 5 to 20% by weight.

The concentration of the calcium chloride is selected according to the amount of the aliphatic aromatic polyamide. If the calcium chloride concentration is lower than the range based on the amount of the aliphatic polyamide mentioned above, the solubility is reduced. Since effects are not increased even if the concentration of the calcium chloride is higher than the range, the higher concentration of the calcium chloride is economically disadvantageous. Since the solubility may be deteriorated when a prescribed amount or more of water is present in the solution composition, the molar amount of water must be controlled to 5 times or less that of the calcium chloride even at the maximum.

A method for dropping (or pouring) the corresponding aliphatic aromatic polyamide solution composition into a bath comprising a precipitant consisting essentially of water and precipitating the aliphatic aromatic polyamide while stirring the bath is adopted in producing the fibrids by using the aliphatic aromatic polyamide solution composition in the same manner as that of the aliphatic polyamide fibrids.

Water alone can be used as the precipitant or further mixed with other precipitants or a precipitation regulator. For example, an amide-based solvent such as NMP can be used as the precipitation regulator. The amount of the mixed amide-based solvent in the precipitant is preferably controlled to 30% by weight or below in the precipitant. The temperature of the precipitant is also one of important factors in obtaining fibrids with excellent papermaking properties and shape, and the temperature is usually 10° to 70° C., preferably 15° to 50° C.

The precipitant is stirred at a high speed, and operations are preferably performed so as to desolvate the solution composition introduced into the bath and simultaneously apply shearing or beating actions thereto. The precipitant is used in an amount based on the aliphatic aromatic polyamide solution composition at a weight ratio of preferably 5/1 to 200/1, especially preferably 10/1 to 100/1.

Thus, fibrids comprising the aliphatic or aliphatic aromatic polyamide with good papermaking properties can economically be produced by using the precipitant consisting essentially of water.

(e) Production of Paper-like Sheet Materials

In this invention, the polyamide fibrids thus produced can be mixed with staple fibers or natural pulps and formed into paper-like sheet materials, (i.e., synthetic paper) with excellent heat resistance and good mechanical characteristics. In the process, the amount of the polyamide fibrids in the sheet-like materials can optionally be changed depending on their uses, and the preferable amount is within the range of 5 to 95% by weight, especially preferably 20 to 80% by weight.

Therefore, when paper is produced from only the fibrids obtained according to this invention and staple fibers, the weight ratio of the fibrids/staple fibers is preferably 80/20 to 20/80.

Various fibers can be employed as the staple fibers used in producing paper-like sheets from the fibrids and staple fibers in this invention. Specific examples thereof include polyester fibers such as polyethylene terephthalate fibers or polybutylene terephthalate fibers; aliphatic polyamide fibers such as nylon 6 or nylon 6 6 fibers; wholly aromatic polyamide fibers such as poly-m-phenylene isophthalamide fibers or poly-p-phenylene terephthalamide fibers; polyolefin-based fibers such as polyethylene fibers or polypropylene fibers; polyacrylonitrile fibers; polycarbonate fibers and the like. Furthermore, glass fibers, ceramic fibers, carbon fibers, asbestos, metallic fibers and potassium titanate fibers can also be used.

The single fiber size of the staple fibers used in this invention can very depending on their use; however, low count fibers of usually 0.1 to 5 denier (0.11 to 5.5 dtx.) can be advantageously used so as to further improve the dispersibility in the polyamide fibrlids. The length of the staple fibers is not especially limited, but is usually 1 to 30 mm, preferably 2 to 15 mm.

The polyamide fibrids are preferably mixed with the staple fibers and made into paper in this invention employing a wet process by using a paper machine such as a Fourdrinier paper machine or a cylinder paper machine in the same manner used in papermaking employing conventional wood pulps. In this case, a surfactant, a dispersing agent, a thickening agent or other additives, if desired, may be added thereto.

The polyamide fibrids of this invention can be well mixed even with natural pulps produced from wood to form paper. Even in this case, the weight ratio of the fibrids/natural pulps is preferably 80/20 to 20/80.

Natural pulps or pulp-like materials obtained from other polymers (for example, wholly aromatic Polyamide fibrids or polyolefin pulp-like materials), if desired, can be mixed with the polyamide fibrids and staple fibers for use in papermaking of paper-like sheets therefrom in this invention. Further, mica, kaolin, talc, glass flakes or the like in a small proportion, for example, 50% or less based on the paper weight can be mixed therewith and formed into paper.

The paper-like sheets (synthetic paper) thus obtained can be dried and then directly used; however, excellent performance can be obtained by hot-pressing or calendering with, for example, a hot press or a hot roll. Although the temperature used in the hot-pressing varies depending on the kinds of the aliphatic polyamide or aliphatic aromatic polyamide and staple fibers used, the amount of the fibrids in the sheet and the like, it is usually 50° to 350° C., preferably 100° to 300° C. The pressure also varies depending on the kinds of the polyamide forming the fibrids and staple fibers and the amount of the fibrids in the paper-like sheets, use of the sheet; however, the pressure is usually 400 kgf/cm2 or below, especially preferably 10 to 300 kgf/cm$^2$.

The solution composition of this invention is useful for preparing polyamide fibrids by wet-shaping method. The aliphatic polyamide or aliphatic aromatic polyamide fibrids (pulp-like materials) obtained according to this invention have good papermaking properties, and paper-like sheets (synthetic paper) with excellent characteristics can be produced by using the fibrids. Since the sheets comprising the polyamide fibrids do not contain any concentrated sulfuric acid or formic acid in the resulting products, they are extremely advantageous without corrosion of the apparatus, jigs and the like occurring in various fields of uses and further deteriorating the quality in the environment of use.

Since good paper-like sheet can be produced even from the fibrids of inexpensive aliphatic polyamides or aliphatic aromatic polyamides relatively good in heat resistance according to this invention, the sheet can effectively be utilized for industrial and consumer uses, for example, in the field of electrical and electronic materials as electrical insulating papers, separators for batteries or cells or diaphragms for electrolytic solutions; packaging materials as bags for heavy goods, indoor or automotive interior trim materials; maps or loan paper, speaker cone papers or honeycomb core materials.

Furthermore, since water or an aqueous precipitant is used as the precipitant in producing the aliphatic polyamide or aliphatic aromatic polyamide fibrids, this invention is advantageous in cost and suitable from a safety and environment standpoint.

This invention is explained more specifically by way of Examples and Comparative Examples hereinafter. These Examples and Comparative Examples are intended to illustrate the present invention, and the description thereof is not to be construed as limiting the scope of this invention.

All "parts" and "%" in the Examples and Comparative Examples are by weight unless otherwise noted, and all amount ratios denote ratios by weight.

The tensile test of the paper (sheet) is carried out by measuring the tenacity at a sample width of 5 cm according to JIS P 8133-1976 (testing method for tensile strength of paper and paperboard).

EXAMPLE 1

This Example illustrates an example of a solution composition of polycaprolactam (nylon 6) and the production of fibrids.

Dried pellets of polycaprolactam were pulverized into a fine powder by using a pulverizer. In a three neck flask, was placed 30 parts of the fine powder, together with 170 parts of NMP and 15 parts of calcium chloride. The temperature was increased while stirring the resulting mixture at 150° C. in an atmosphere of nitrogen, and the stirring was continued at this temperature for 5 hours to dissolve the polycaprolactam fine powder. The temperature was further increased to 180° C. to dissolve the remaining fine particles. Thereby, a transparent polycaprolactam solution composition was prepared.

The solution composition was cooled to 20° C. to provide a viscous thick malt syrupy material. The resulting material was reheated to 50° C. and dissolved to achieve a liquid.

The obtained solution composition was slowly dropped (poured) into a water surface to form a thin film, which was then thoroughly washed with water to provide a polycaprolactam thin film.

The polycaprolactam solution composition was further dropped into an aqueous solution comprising water and NMP at a weight ratio of water/NMP of 90/10 at 20° C. while stirring the aqueous solution in a blender to produce fibrids of the polycaprolactam.

COMPARATIVE EXAMPLE 1

The heating and stirring were carried out under the same conditions as those in Example 1 to try to dissolve the same polycaprolactam (nylon 6) as that in Example 1 by using various solvents (solvent systems each comprising a single solvent and calcium chloride) other than the solvent system comprising NMP and calcium chloride. The following Table 1 collectively shows the results obtained, wherein abbreviations for the solvents in Table 1 are as follows:

DMF: N,N-Dimethylformamide
DMAC: N,N-Dimethylacetamide
DMI: N,N-Dimethylimidazolidinone
TMU: Tetramethylurea
DMSO: Dimethyl sulfoxide
EG: Ethylene glycol

TABLE 1

| Run No. | Single Solvent or Solvent System | Solubility |
| --- | --- | --- |
| 1 | DMF | Insoluble |
| 2 | DMAC | " |
| 3 | DMI | " |
| 4 | TMU | " |
| 5 | DMSO | " |
| 6 | EG | " |
| 7 | NMP | " |
| 8 | DMF/CaCl$_2$ | " |
| 9 | DMAC/CaCl$_2$ | " |
| 10 | DMI/CaCl$_2$ | " |
| 11 | TMU/CaCl$_2$ | " |
| 12 | DMSO/CaCl$_2$ | " |
| 13 | EG/CaCl$_2$ | " |

As can be seen from the results in Table 1 above, the polycaprolactam (nylon 6) was insoluble in all the cases of using the various amide-based organic solvents or the urea-based organic solvents alone (Run Nos. 1 to 7) and solvent systems comprising calcium chloride added to solvents other than NMP (Run Nos. 8 to 13), and the objective solution composition could not be obtained.

EXAMPLE 2

This Example illustrates an example of preparing a polycaprolactam (nylon 6) solution composition and further producing fibrids and a paper-like sheet using the solution composition.

Dried pellets of polycaprolactam were pulverized into a fine powder by using a pulverizer in the same manner as in Example 1. In a three neck flask, was placed 30 parts of the fine powder, together with 170 parts of NMP and 15 parts of unhydrated calcium chloride. The temperature was increased while stirring the resulting mixture at 150° C. under an atmosphere of nitrogen, and the stirring was continued at the temperature for 5 hours to dissolve the polycaprolactam. The temperature was further increased to 180° C. to dissolve the remaining fine particles. Thereby, a transparent polycaprolactam solution composition was prepared.

The resulting solution composition was cooled to 50° C. and then dropped (or poured) into a large excess amount of a mixed aqueous solution of a water/NMP system (with an NMP content of 5% by weight) cooled to 20° C. while stirring the aqueous solution. Thereby, fibrid precipitates of the polycaprolactam were obtained and further repetitively washed with a large amount of water to remove residual calcium chloride and NMP. The obtained hydrated fibrid-like materials were dried in a steam dryer at 120° C. to provide the objective dried fibrids of the polycaprolactam.

The hydrous fibrids thus produced (in an amount of 50 parts expressed in terms of solid weight) and 50 parts of nylon 6 staple fibers having a fiber length of 3 mm and a size of 1.5 denier (1.65 dtx) were dispersed in a large amount of water. The prepared aqueous dispersion was formed into a sheetlike material by using a Tappi standard sheet machine. Thereby, a sheet, good with draining from the machine wire, papermaking properties and formation was obtained.

The formed sheet was dried at 70° C. for 3 hours, hot-pressed under conditions of 180° C. and 50 kgf/cm$^2$ to provide nylon 6 synthetic paper having a thickness of about 12 μm and a weight of 60 g/m$^2$. The synthetic paper had a tensile strength of 1.7 kgf/5 cm and a tensile elongation of 3.0%.

EXAMPLE 3

This Example relates to the preparation of fibrids from polycaprolactam (nylon 6) and production of a paper-like sheet material using the fibrids.

An aqueous dispersion containing 50 parts (expressed in terms of the solid weight) of the fibrids of polycaprolactam produced in the same manner as in Example 2 and 50 parts of nylon 6 6 staple fibers having a fiber length of 3 mm and a size of 1.5 denier (1.65 dtx) was formed into a sheet by using a Tappi standard sheet machine, and the resulting sheet was dried by heating in a drum type dryer heated with steam at 110° C. to provide a paper-like sheet (nylon 6 6 synthetic paper) having a thickness of 125 μm and a weight of 60 g/cm$^2$.

EXAMPLE 4

The polycaprolactam fibrids (nylon 6) produced in Example 2 and ultrafine polyethylene terephthalate (PET) staple fibers having a size of 0.3 denier (0.33 dtx) and a fiber length of 3 mm were mixed so as to provide a dry weight ratio of 50/50, and the resulting mixture was dispersed in a large excess amount of water. The prepared dispersion was formed into a sheet by using the sheet machine in the same manner as in Example 2. The dispersibility was good, and a uniform paper-like sheet was obtained and then calendered to obtain a synthetic paper having a thickness of 120 μm, a weight of 60 g/m$^2$, a tensile strength of 1.8 kgf/5 cm and a tensile elongation of 2.5%.

EXAMPLE 5

This Example relates to an example of a solution composition of polyhexamethylene adipamide (nylon 6 6) and production of fibrids using the solution composition.

In a three neck flask, was placed 22 parts of dried fine powder of polyhexamethylene adipamide, 178 parts of NMP and 15 parts of calcium chloride (CaCl$_2$.H$_2$O) containing 2 molecules of water of crystallization. The temperature was increased to 150° C. in an atmosphere of nitrogen while stirring the mixture, and the stirring was continued at the temperature for 7 hours to dissolve the polyhexamethylene adipamide. The temperature was further increased to 180° C., and the stirring was carried out for 2 hours. Thereby, the polyhexamethylene adipamide was completely dissolved to produce a homogeneous solution composition, which was then cooled at 50° C. A film and fibrids were further produced in the same manner as in Example 1.

EXAMPLE 6

This Example illustrates an example of preparing a solution composition of polyhexamethylene adipamide (nylon 6 6) and producing fibrids and a sheet using the solution composition.

In a three neck flask, was placed 22 parts of dried fine powder of polyhexamethylene adipamide, 178 parts of NMP and 15 parts of calcium chloride (CaCl$_2$ 2H$_2$O) containing 2 molecules of water of crystalization in the same manner as that in Example 5. The temperature was then increased to 150° C. while stirring the mixture in an atmosphere of nitrogen, and the stirring was continued at this temperature for 7 hours to dissolve the polyhexamethylene adipamide. The temperature of the resulting solution was increased to 180° C., and the solution was further stirred for 2 hours. Thus, the polyhexamethylene adipamide was completely dissolved to provide a homogeneous solution composition.

The polyhexamethylene adipamide solution composition obtained was cooled to 50° C. and then dropped into a large excess amount of water kept at 20° C. while stirring the water. Thereby, fibrid precipitates of the polyhexamethylene adipamide were obtained and repetitively washed with water to remove calcium chloride and NMP remaining in the precipitates. The hydrated fibrids were dried with a hot-air dryer to obtain dried fibrids of the polyhexamethylene adipamide (nylon 6 6).

The fibrids were mixed with staple fibers prepared by cutting nylon 6 6 fibers having a size of 1.5 denier (1.65 dtx) to 5 mm so as to provide a ratio of 50/50 expressed in terms of dry weight ratio, and the obtained mixture was dispersed in a large amount of water and formed to prepare a sheetlike material from the polyhexamethylene adipamide fibrids and nylon 6 6 fibers in the same manner as in Example 2.

The sheet obtained was dried and hot-pressed in the same manner as in Example 2 to obtain a synthetic paper having a thickness of 130 µm, a weight of 65 g/m$^2$, a tensile strength of 1.8 kgf/5 cm and a tensile elongation of 5.5%. The dispersibility of the respective components in the papermaking operations was excellent and the papermaking could be carried out smoothly to obtain a uniform paper-like sheet (nylon 6 6 synthetic paper).

EXAMPLE 7

This Example relates to the preparation of a solution composition of polyhexamethylene terephthalisophthaladipamide (nylon 6 TI6) which is an aliphatic aromatic polyamide.

Pellets of a copolymer (nylon 6 TI6) which was prepared by copolymerization at a composition ratio of 100 moles of hexamethylene diamine with 65 moles of terephthalic acid, 25 moles of isophthalic acid and 10 moles of adipic acid and had a melting point of 279° to 282° C. were pulverized into a fine powder using a pulverizer. In a three neck flask, was placed 45 parts of the fine powder of the copolymer, together with 330 parts of NMP and 49 parts of calcium chloride. The temperature was then increased to 180° C. while stirring the mixture under atmosphere of nitrogen, and the stirring was continued at this temperature for hours to dissolve the polymer. The temperature was further increased to 200° C., and the stirring was continued to completely dissolve the residual fine particles. Thereby, a transparent solution composition of nylon 6 TI6 copolymer was obtained.

COMPARATIVE EXAMPLE 2

The heating and stirring of the same polyhexamethylene terephthalisophthaladipamide (nylon 6 TI6 copolymer) as in Example 7 were carried out under the same conditions as in Example 7 to try to dissolve the copolymer using various solvents (solvent systems, each comprising a single solvent and calcium chloride) other than the solvent system comprising NMP and calcium chloride of this invention results in Table 2 below collectively shows the results obtained. The abbreviations of the solvents in Table 2 are the same as these used for Table 1.

TABLE 2

| Run No. | Single Solvent or Solvent System | Solubility |
| --- | --- | --- |
| 1 | DMF | Insoluble |
| 2 | DMAC | " |
| 3 | DMI | " |
| 4 | TMU | " |
| 5 | DMSO | " |

TABLE 2-continued

| Run No. | Single Solvent or Solvent System | Solubility |
| --- | --- | --- |
| 6 | EG | " |
| 7 | NMP | " |
| 8 | DMF/CaCl$_2$ | " |
| 9 | DMAC/CaCl$_2$ | " |
| 10 | DMI/CaCl$_2$ | " |
| 11 | TMU/CaCl$_2$ | " |
| 12 | DMSO/CaCl$_2$ | " |
| 13 | EG/CaCl$_2$ | " |

As can be seen from the results in Table 2 above, the polyhexamethylene terephthalisophthaladipamide (nylon 6 TI6 copolymer) was insoluble in all cases of using the various amide-based organic solvents or urea-based organic solvents alone (Run Nos. 1 to 7) and solvent systems comprising calcium chloride added to solvents other than NMP (Run Nos. 8 to 13), and a solution composition could not be obtained.

EXAMPLE 8

The solution composition of a polyhexamethylene terephthalisophthaladipamide (nylon 6 TI6 copolymer) prepared as in Example 7 was cooled to 50° C. and then dropped into a large excess amount of a mixed aqueous solution of a water/NMP system (with an NMP content of 5% by weight) cooled to 20° C. while stirring the mixed aqueous solution to provide fibrid precipitates of the nylon 6 TI6 copolymer.

The resulting fibrid precipitates were further repeadedly washed with water to remove calcium chloride and NMP remaining in the fibrids. The hydrated fibrids were dried in a steam dryer at 120° C. to obtain aliphatic aromatic polyamide fibrids.

The hydrated fibrids of the nylon 6.TI6 copolymer (in an amount of 50 parts expressed in terms of solid weight) and 50 parts of nylon 6 staple fibers having a fiber length of 3 mm and a size of 1.5 denier (1.65 dtx) were dispersed in a large amount of water, and the prepared dispersion was then formed into a sheet by using a Tappi standard sheet machine. The formed paper-like sheet had excellent draining from the machine wire, papermaking properties and formation.

The sheet obtained was dried at 70° C. for 3 hours and then hot-pressed under conditions of a temperature of 180° C. and a pressure of 60 kgf/cm$^2$ using a flat plate press to obtain synthetic paper having a thickness of about 130 µm, a weight of 60 g/m$^2$, a tensile strength of 1.9 kgf/5 cm and a tensile elongation of 3.0%.

EXAMPLE 9

This Example illustrates the preparation of a solution composition used for producing fibrids of polyhexamethylene terephthalisophthalamide (nylon 6 TI copolymer) which is an aliphatic aromatic polyamide.

Pellets of the nylon 6 TI copolymer prepared by copolymerization at a composition ratio of 100 moles of hexamethylenediamine, 78 moles of terephthalic acid and 22 moles of isophthalic acid were pulverized into a fine powder with a pulverizer. In a three neck flask, was placed 23 parts of the resulting fine powder of the nylon 6 TI copolymer, 177 parts of NMP and 20 parts of calcium chloride (CaCl$_2$.2H$_2$O) containing 2 molecules of water of crystallization. The temperature was then increased to 170° C. while stirring the prepared mixture in an atmosphere of nitrogen. The stirring was continued at the temperature for 7 hours to dissolve the nylon 6 TI copolymer. The temperature of the solution was further increased to 190° C., and the resulting solution was stirred for 2 hours. Thereby, the copolymer was completely dissolved to provide a homogeneous solution composition.

EXAMPLE 10

This Example is an example of producing fibrids and a paper-like sheet using a solution composition of the polyhexamethylene terephthalisophthalamide (nylon 6 TI copolymer) prepared as in Example 9.

The solution composition of the nylon 6 TI copolymer prepared as in Example 9 was cooled to 50° C. and then dropped into a large excess amount of water kept at 20° C. whole stirring the water to provide fibrid precipitates of the nylon 6 TI copolymer. The resulting fibrid precipitates were repeadly washed with water to remove residual calcium chloride and NMP. The hydrated fibrids were dried with a hot-air dryer to obtain fibrids of the nylon 6 TI copolymer.

The hydrated fibrids of nylon 6 TI copolymer thus obtained were mixed with nylon 6 6 staple fibers having a fiber length of 3 mm and a size of 1.5 denier so as to provide a ratio of 50/50 expressed in terms of dry weight ratio, and the resulting mixture was dispersed in a large amount of water. Thereby, a sheet of the nylon 6 TI copolymer/nylon 6 6 was prepared in the same manner as in Example 2. The dispersibility in the papermaking operations was excellent, and a uniform paper-like sheet (synthetic paper) was obtained.

Furthermore, hot-pressing treatment was carried out under the same conditions as those in Example 7 to obtain synthetic paper having a hickness of 125 μm, a weight of 65 g/m², a tensile strength of 2.0 kgf/5 cm and a tensile elongation of 5.0%.

EXAMPLE 11

In a three neck flask, was placed 15 parts of polyhexamethylene terephthalamide (nylon 6 T) prepared by carrying out the solution polymerization of hexamethylenediamine with terephthaloyl chloride at an equimolar ratio in a solvent of NMP, together with 100 parts of NMP and 15 parts of calcium chloride ($CaCl_2$). The temperature was increased to 180° C. in an atmosphere of nitrogen while stirring the mixture, and the stirring was continued at this temperature for 5 hours. The temperature was further increased to 200° C. during the stirring.

As a result, remaining fine powder was dissolved to prepare a solution composition of polyhexamethylene terephthalamide (nylon 6 T).

The prepared solution composition was cooled to 50° C. and dropped into an aqueous solution of a water/NMP system (with an NMP content of 5% by weight) kept at 20° C. while stirring the aqueous solution to provide fibrid precipitates of the nylon 6 T. The resulting precipitates were further repeatedly washed with a large amount of water to remove NMP and calcium chloride remaining in the fibrid precipitates. Thereby, hydrated fibrids were obtained.

The fibrids of the nylon 6 T (in an amount of 60 parts expressed in terms of dry weight) were mixed with polyethylene terephthalate (PET) staple fibers (in an amount of 40 parts) having a size of 0.3 denier and a fiber length of 3 mm and dispersed in a large amount of water in the same manner as that in Example 2, and the prepared dispersion was formed into a sheet by using the sheet machine. The papermaking properties of the fibrids were excellent.

The resulting paper-like sheet was dried and further hot-pressed under conditions of 180° C. and 60 kgf/cm² to obtain homogeneous synthetic paper of the nylon 6 T/PET system having a thickness of 120 μm, weight of 58 g/m², a tensile strength of 2.0 kgf/5 cm and a tensile elongation of 3.0%.

EXAMPLE 12

This Example illustrates an example of producing a honeycomb core using the paper-like sheet produced according to this invention.

(1) Coating of Adhesive and Lamination

One side of the polycaprolactam (nylon 6) paper-like sheet obtained as in Example 2 was coated with an epoxy resin-based adhesive (Epikote 828®/Epikote 871®/Epicure Z®=50/50/20, manufactured by the Yuka Shell Epoxy K.K.) into a strip form at a width of 7 mm and a pitch of 28 mm, and the sheet was laminated while shifting the coated side by a half pitch. The resulting laminate was then heat bonded with a press heated at 140° C. under a pressure of 20 kgf/cm² (gauge pressure) for 20 minutes to obtain an unextended honeycomb core. The coating amount of the adhesive was 55.0% by weight based on the sheetlike material which was a substrate.

(2) Extension, Impregnation with Resin and Curing

The unextended honeycomb core obtained in (1) was cut to a width of 7 mm (corresponding to the thickness of the honeycomb core) in a direction perpendicular to the strip pattern of the adhesive. The cut unextended honeycomb core was then extended to provide a honeycomb form. The obtained honeycomb core was then impregnated with a previously prepared epoxy resin solution (Epikote 828®/Epicure Z®/acetone=100/20/180, manufactured by Yuka Shell Epolxy K.K.) and kept in a fixed shape. The acetone was further removed by air-drying and subsequently cured by heating at 95° C. for 2 hours and then 120° C. for 4 hours.

(3) Performance of Honeycomb

The honeycomb core after curing had an apparent specific gravity of 0.025 g/cm³ and a compressive strength of 5.5 kgf/cm² (cell size: 7 mm and core thickness: 7 mm).

EXAMPLE 13

A uniform solution was prepared by heating and dissolving 22 parts of fine powder of polyhexamethylene adipamide (nylon 6 6), 178 parts of NMP and 15 parts of calcium chloride ($CaCl_2.2H_2O$) containing 2 molecules of water of crystallization, and the same procedures as in Example 6 were followed to provide fibrids of polyhexamethylene adipamide (nylon 6 6).

An aqueous dispersion of 50 parts of the fibrids and 50 parts of nylon 6 6 staple fibers having a single fiber size of 1.5 denier (1.65 dtx) and a fiber length of 5 mm was then formed into a sheet using a wet process. The resulting sheet had a thickness of 130 μm and a weight of 65 g/m².

The obtained sheet was then coated with an adhesive, laminated, contact bonded and extended to provide an extended honeycomb core (cell size 7 mm and cell thickness: 7 mm), which was then impregnated with a phenolic resin solution (No. 110, manufactured by Cemedine Co., Ltd., a methyl ethyl ketone solution), air-dried and further heated in a hot-air dryer at 100° C. for 2 hours and then 160° C. for 2 hours to obtain a honeycomb core having an apparent specific gravity of 0.052 g/cm³. The compressive strength of the resulting honeycomb core impregnated with the phenolic resin was as good as 18.5 kgf/cm².

EXAMPLE 14

A sheet was prepared from 60 parts of the polyhexamethylene adipamide (nylon 6 6) fibrids obtained as in Example 13 and 40 parts of staple fibers (fiber length: 3 mm) made from a copolymerized aromatic polyamide of p-phenylenediamine/3,4-diaminodiphenyl ether and terephthalic acid (Technora®, manufactured by Teijin Limited).

The epoxy resin-based adhesive was applied onto the sheetlike material, and lamination and extension were carried out in the same manner as in Example 12 to obtain an extended honeycomb core, which was further impregnated with an epoxy resin, hot cured and fixed to provide a honeycomb core impregnated with the epoxy resin. The apparent specific gravity of the honeycomb core was 0.048 g/cm$^3$, and the compressive strength was as good as 16.5 kgf/cm$^2$.

EXAMPLE 15

A solution was prepared by heating and dissolving 45 parts of fine powder of an aliphatic aromatic polyamide (nylon 6 TI6 copolymer) obtained from 100 moles of hexamethylenediamine, 65 moles of terephthalic acid, 25 moles of isophthalic acid and 10 moles of adipic acid, 330 parts of NMP and 40 parts of calcium chloride while stirring the mixture, and the resulting solution was cooled to 50° C. The cooled solution was then dropped into an aqueous solution of a water/NMP system (with an NMP content of 5% by weight) at 20° C. while stirring the aqueous solution to produce fibrids of the aliphatic aromatic polyamide, (nylon 6 TI6 copolymer).

A paper-like sheet having a thickness of 130 μm and a weight of 60 g/m$^2$ was then produced from 50 parts of the fibrids thus obtained and 50 parts of nylon 6 staple fibers (fiber length: 3 mm and size: 1.5 denier) in the same manner as in Example 2.

An epoxy resin-based adhesive was subsequently applied onto the sheet, and lamination and extension were performed in the same manner as in Example 12 to produce an extended honeycomb core. Impregnation with the epoxy resin, hot curing and fixing were then carried out in the same manner as in Example 12 to obtain a honeycomb core impregnated with the epoxy resin. The apparent specific gravity of the resulting honeycomb core was 0.050 g/cm$^3$, and the compressive strength was at least 18.0 kgf/cm$^2$.

A filmy epoxy-based adhesive (MXF-7303, manufactured by Kasei Fiberite Corp.) was set on both the top and the bottom surfaces of the honeycomb core, and separately prepared glass fiber-cloth reinforced epoxy resin laminates were superposed on both surfaces thereof. Vacuum bagging was carried out, and an autoclave molding machine at 125° C. was then used to bond and cure the laminate to produce a honeycomb core panel. The compressive strength of the resulting honeycomb core panel was 35.0 kgf/cm$^2$.

EXAMPLE 16

A solution was prepared by heating and dissolving 23 parts of fine powder of an aliphatic aromatic polyamide (nylon 6 TI) obtained from 100 moles of hexamethylenediamine, 78 moles of terephthalic acid and 22 moles of isophthalic acid, 177 parts of NMP and 20 parts of calcium chloride (CaCl$_2$ 2H$_2$ O) containing 2 molecules of water of crystallization. The resulting solution was then cooled to 50° C. and subsequently dropped into an aqueous solution of a water/NMP system in the same manner as in Example 8 to provide fibrids of aliphatic aromatic polyamide (nylon 6 TI).

With 50 parts of the fibrids thus obtained, was mixed 50 parts of nylon 6 6 staple fibers (fiber length: 3 mm and size: 1.5 denier). The papermaking and hot-pressing were carried out in the same manner as in Example 9 to, produce a sheet having a thickness of 125 μm and a basis weight of 65 g/m$^2$.

The resulting paper-like sheet was then coated with an adhesive, laminated, contact bonded and extended in the same manner as in Example 12 to obtain an extended honeycomb core, which was then impregnated with a phenolic resin (No. 110, manufactured by Cemedine Co., Ltd.) in the same manner as in Example 13, air-dried and further kept at 120° C. for 1 hour and then 160° C. for 1 hour, to produce a honeycomb core having an apparent specific gravity of 0.048 g/cm$^3$. The compressive strength of the honeycomb core impregnated with the phenolic resin was as good as 18.5 kgf/cm$^2$.

EXAMPLE 17

A sheet obtained from the fibrids of the nylon 6 TI prepared as in Example 10 and nylon 66 fibers was dried at 70° C. for 3 hours and then hot-pressed with a flat plate press under conditions of a temperature of 180° C. and a pressure of 60 kgf/cm$^2$ to provide a synthetic paper having a thickness of about 125 μm and a basis weight of 60 g/cm$^2$. The tensile strength thereof was at least 1.95 kgf/5 cm, and the tensile elongation was at least 3.5%.

The air permeability of the synthetic paper (according to JIS P 98117) was 30 sec/100 ml, and the synthetic paper can effectively be used as a separator for gastight secondary batteries.

EXAMPLE 18

Into about 800 ml of ion exchange water, was added and homogeneously dispersed 1.6 parts (based on the dry weight) of fibrids of the nylon 6 prepared in the same manner as in Example 2 at a high speed. On the other hand, 1.6 parts (based on the dry weight) of natural pulp used in filter paper for chemical analysis was homogeneously dispersed in about 800 ml of ion exchange water in the same manner as described above.

The dispersion of the nylon 6 fibrids was mixed with the dispersion of the natural pulp, and vigourous stirring was further carried out to provide a homogeneous dispersion, which was formed into a sheetlike material of 25 cm length×25 cm width by using a Tappi standard sheet machine. The draining from the machine wire and papermaking properties were excellent.

The resulting sheet was dried at 70° C. for 3 hours and then hot-pressed under conditions of a temperature of 180° C. and a pressure of 50 kgf/cm$^2$ to afford mixed paper of nylon 6/natural pulp having a thickness of about 128 μm and a basis weight of 60 g/cm$^2$. The mixed paper obtained had a tensile strength of 1.15 kgf/5 cm and a tensile elongation of 1.8%.

While the invention has been described in detail and with reference to specific embodiments thereof, it will be apparent to one skilled in the art that various changes and modifications can be made therein without departing from the scope thereof.

What is claimed is:

1. A polyamide composition comprising a solution of:
    (i) an aliphatic polyamide, an aliphatic aromatic polyamide or a mixture thereof;
    (ii) N-methyl-2-pyrrolidone; and
    (iii) calcium chloride.

the ratio between said polyamide (i) and the N-methyl-2-pyrrolidone (ii) in said composition being 3 to 25% by weight of said polyamide(i) to 97 to 75% by weight of the N-methyl-2-pyrrolidone (ii) and said solution containing the calcium chloride (iii) in an amount of 5 to 60 parts by weight based on 100 parts by weight of said polyamide(i).

2. The polyamide composition according to claim 1, wherein the aliphatic polyamide (i) is at least one polyamide selected from the group consisting of polycaprolactam, polyhexamethylene adipamide, polytetramethylene adipamide and polyhexamethylene sebacamide.

3. The polyamide composition according to claim 2, wherein the ratio between the aliphatic polyamide (i) and the N-methyl-2-pyrrolidone (ii) in the composition is 5 to 20% by weight of said polyamide (i) to 95 to 80% by weight of the N-methyl-2-pyrrolidone (ii) and calcium chloride (iii) is present in an amount of 5 to 55 parts by weight based on 100 parts by weight of said polyamide(i).

4. The polyamide composition according to claim 1, wherein the aliphatic aromatic polyamide (i) is polyhexamethylene terephthalamide, polyhexamethylene isophthalamide, polyhexamethylene terephthalisophthalamide, polyhexamethylene terephthalisophthaladipamide or copolyamides including the above polyamides.

5. The polyamide composition according to claim 4, wherein the ratio between the aliphatic aromatic polyamide (i) and the N-methyl-2-pyrrolidone (ii) in the polyamide composition is 5 to 20% by weight of said polyamide (i) to 95 to 80% by weight of the N-methyl-2-pyrrolidone (ii) and calcium chloride (iii) is present in an amount of 5 to 55 parts by weight based on 100 parts by weight of said polyamide (i).

6. A method for producing polyamide fibrids, which comprises introducing a polyamide solution composition as in claim 1 into a precipitant consisting essentially of water while stirring said precipitant and precipitating the polyamide (i) into fibrids.

7. A method for producing aliphatic polyamide fibrids, which comprises introducing an aliphatic polyamide composition as in claim 2 into a precipitant consisting essentially of water while stirring said precipitant and precipitating the polyamide (i) into fibrids.

8. A method for producing aliphatic aromatic polyamide fibrids, which comprises introducing an aliphatic aromatic polyamide composition as in claim 4 into a precipitant consisting essentially of water while stirring said precipitant and precipitating the polyamide (i) into fibrids.

9. The method for producing polyamide fibrids according to claim 6, wherein the precipitant is water or an aqueous solution of N-methyl-2-pyrrolidone.

10. A method for producing a synthetic paper, which comprises:

(a) introducing a polyamide solution composition into a precipitant consisting essentially of water while stirring said precipitant and precipitating the polyamide into fibrids followed by mixing said polyamide fibrids with staple fibers; wherein said polyamide solution composition comprises:

(i) an aliphatic polyamide, an aliphatic aromatic polyamide or a mixture thereof;

(ii) N-methyl-2-pyrrolidone; and (iii) calcium chloride;

wherein the ratio between said polyamide (i) and the N-methyl-2-pyrrolidone (ii) in said composition is 3 to 25% by weight of said polyamide (i) to 75 to 97% by weight of the N-methyl-2-pyrrolidone (ii) and said calcium chloride (iii) is present in an amount of 5 to 60 parts by weight based on 100 parts by weight of said polyamide (i); and (b) forming a sheet material.

11. The method for producing a synthetic paper of claim 10, wherein said sheetlike material is hot-pressed into a paper sheet.

12. A method for producing mixed polyamide-natural pulp paper, which comprises:

(a) introducing a polyamide solution composition into a precipitant consisting essentially of water while stirring said precipitant and precipitating the polyamide into fibers followed by mixing said polyamide fibers with natural pulp; wherein said polyamide solution composition comprises:

(i) an aliphatic polyamide, an aliphatic aromatic polyamide or a mixture thereof;

(ii) N-methyl-2-pyrrolidone; and (iii) calcium chloride;

wherein the ratio between said polyamide (i) and the N-methyl-2-pyrrolidone (ii) in said composition is 3 to 25% by weight of said polyamide (i) to 75 to 97% by weight of the N-methyl-2-pyrrolidone (ii) and said calcium chloride (iii) is present in an amount of 5 to 60 parts by weight based on 100 parts by weight of said polyamide (i); and (b) forming a sheet material.

13. The method for producing mixed polyamide-natural pulp paper of claim 12, wherein said sheetlike material is hot-pressed into a paper sheet.

* * * * *